C. KIESER.
Meat-Cutting Device.
No. 196,674.      Patented Oct. 30, 1877.
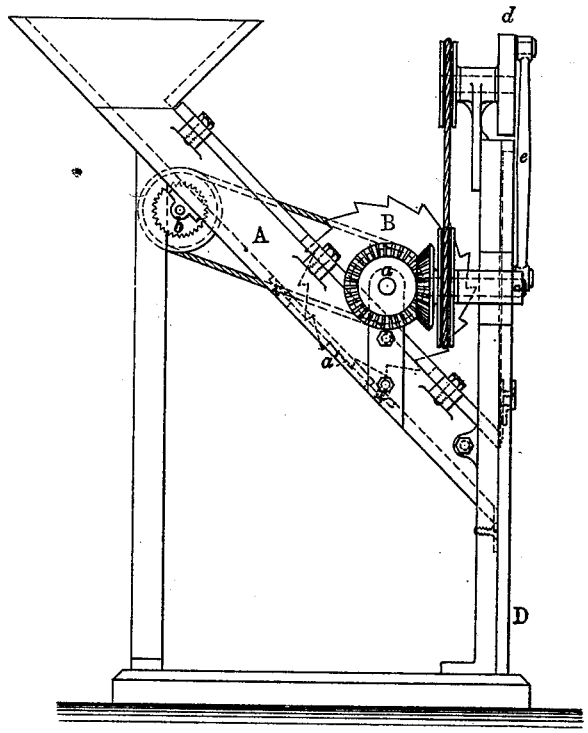
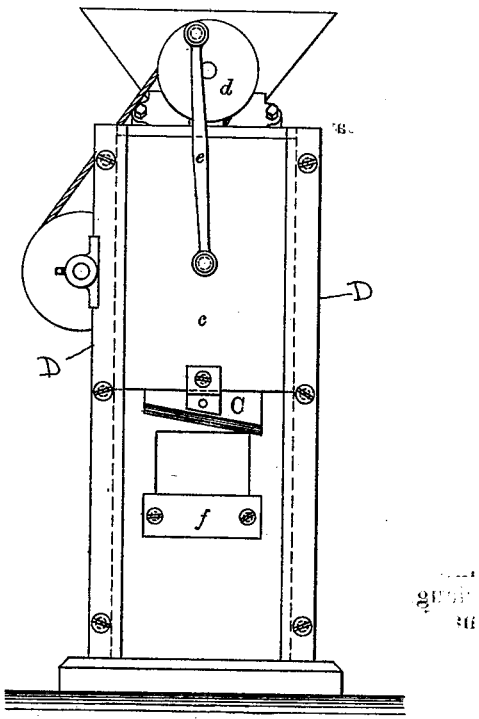
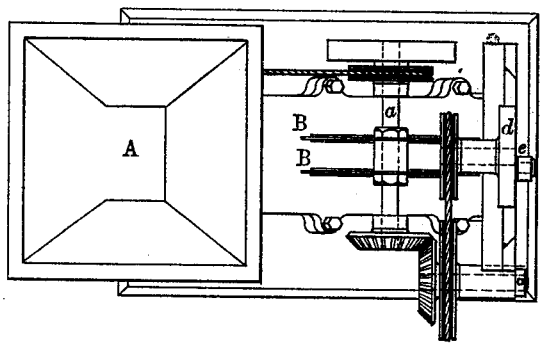
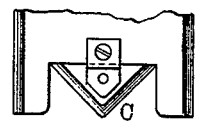
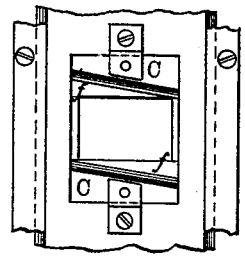
WITNESSES.      INVENTOR.
Wm. W. Frouson      Charles Kieser,
R. E. Grant      by G. H. W. J. Howard
     attys.

UNITED STATES PATENT OFFICE.

CHARLES KIESER, OF BALTIMORE, MARYLAND.

IMPROVEMENT IN MEAT-CUTTING DEVICES.

Specification forming part of Letters Patent No. 196,674, dated October 30, 1877; application filed June 13, 1877.

*To all whom it may concern:*

Be it known that I, CHARLES KIESER, of the city of Baltimore and State of Maryland, have invented certain Improvements in Machines for Cutting Refuse Meats, of which the following is a specification; and I do hereby declare that in the same is contained a full, clear, and exact description of my said invention, reference being had to the accompanying drawing, and to the letters of reference marked thereon.

This invention relates to certain improvements in a machine for preparing, by cutting into small pieces, refuse fatty matter from ..rhter-houses, for the rendering-tanks ordi- ..arily used in the manufacture of lard and tallow, as will hereinafter fully appear.

The invention consists in providing a suitable conveyer-box, into which the refuse animal matter is thrown, with a circular-saw cutting mechanism and a knife-cutting mechanism, by the action of which two systems of cutters the said matter is divided into strips, and also cut transversely, as hereinafter more particularly set forth.

The materials from which lard and tallow are rendered consist of skin to which a certain amount of fatty matter is attached, and pieces cut from hams, shoulders, and other joints of meat in the operation of dressing them for market. And as the skin is usually tough, and the meat frequently adhering to bones, the cutting or chopping of this class of animal matter is not easily accomplished by existing machinery. In the present invention, however, the cutting devices are of such character as not to be easily injured, and the meat is cut in two directions, it being first sawed into strips and then sheared off transversely into small pieces.

In the further description of the invention which follows, reference is made to the drawing, forming a part hereof, and in which—

Figure 1 is a side elevation of my improved machine, and Figs. 2 and 3, respectively, a front view and a plan of the same. Figs. 4 and 5 illustrate certain modifications in parts of the machine.

Similar letters of reference indicate similar parts of the invention in all the views.

A is a conveyer-box, preferably placed in an inclined position, and provided with a hopper at the upper end thereof. B B are saws fastened to a revoluble shaft, $a$, and adapted to rotate partially within the said conveyer-box, the said saws passing through slots in the upper and lower sides of the same. The lower side of the box is provided with a slotted steel plate, $a'$, which plate, in connection with the saws, forms the first cutting device. The plate $a'$ is secured to the box in such manner as to allow of its being removed when broken or otherwise injured to such extent as to render it inoperative. A revoluble toothed roller, $b$, is placed partially within the box, to assist in conducting the meat from the hopper to the saws.

The second cutter consists of a knife, C, constructed to slide with a plate, $c$, to which it is attached, within a frame, D, supporting the delivery end of the conveyer. The plate $c$ has a reciprocating movement through the medium of a crank-wheel, $d$, and a connecting-rod, $e$, the said crank-wheel being connected by any suitable motion-transmitting devices to the shaft carrying the saws. The cutting devices may, however, be independently operated, if desired; but a combined movement of the cutters, as described, is preferred.

In Figs. 1, 2, and 3, a single inclined knife is shown, and the lower edge of the conveyer-opening is protected by a steel plate, $f$; but this form of knife is not necessarily used, as a V-shaped knife, as illustrated in Fig. 4, or two inclined knives, secured at opposite sides of an opening in the plate $c$, may be employed. This last-described arrangement of the knives has the advantage of duplicating the cutting action, as a cut is made at each upward and downward stroke of the plate $c$.

The operation of the machine is as follows: The meat or fat, to be cut into small pieces preparatory to the rendering process, is placed in the hopper, and passes thence to the conveyer, and into contact with the saws. The saws cut the fat into strips, and it will be seen that the action of the saws is such as to produce the desired feed; but should this feed, from any cause, be insufficient to meet the requirements of the saws, the feed-roller $b$ will assist in carrying the material in contact therewith. The fat, after passing the saws, falls to the delivery end of the conveyer, and is cut transversely by means of the knife-cutting mechanism. By cutting the fat into small pieces, as described, the yield of lard or tallow is increased, and less time is consumed in the rendering process.

The residuum, termed "cracklings," will also be of uniform size, and their value, as an article of commerce, thereby enhanced.

Having thus described my invention, what I claim as new, and wish to secure by Letters Patent of the United States, is—

A conveyer-box having suitable receiving and delivering ends combined with a circular-saw cutting mechanism and a reciprocating knife-cutting mechanism, substantially as and for the purposes hereinbefore specified.

In testimony whereof I have hereunto subscribed my name this 19th day of May, in the year of our Lord 1877.

CHARLES KIESER.

Witnesses:
　JOHN T. MEETER,
　HENRY BERRHEIMER.